US010085191B2

(12) United States Patent
Iwai

(10) Patent No.: US 10,085,191 B2
(45) Date of Patent: Sep. 25, 2018

(54) CONTROL DEVICE AND METHOD THEREFOR

(71) Applicant: NEC Corporation, Tokyo (JP)

(72) Inventor: Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/519,389

(22) PCT Filed: Aug. 31, 2015

(86) PCT No.: PCT/JP2015/004404
§ 371 (c)(1),
(2) Date: Apr. 14, 2017

(87) PCT Pub. No.: WO2016/063449
PCT Pub. Date: Apr. 28, 2016

(65) Prior Publication Data
US 2017/0245187 A1    Aug. 24, 2017

(30) Foreign Application Priority Data

Oct. 24, 2014 (JP) ................................ 2014-217630

(51) Int. Cl.
*H04W 36/12* (2009.01)
*H04W 36/30* (2009.01)

(52) U.S. Cl.
CPC .......... *H04W 36/12* (2013.01); *H04W 36/30* (2013.01)

(58) Field of Classification Search
CPC ............................ H04W 36/12; H04W 36/30
See application file for complete search history.

(56) References Cited

U.S. PATENT DOCUMENTS

2005/0020265 A1    1/2005 Funabiki et al.
2009/0067628 A1*   3/2009 Pudney ............... H04L 63/0853
                                                              380/247
(Continued)

FOREIGN PATENT DOCUMENTS

CN        103765948 A    4/2014
EP          2747376 A1   6/2014
(Continued)

OTHER PUBLICATIONS

International Search Report corresponding to PCT/JP2015/004404 dated Oct. 13, 2015 (one page).
(Continued)

*Primary Examiner* — Ronald B Abelson
(74) *Attorney, Agent, or Firm* — Wilmer Cutler Pickering Hale and Dorr LLP

(57) ABSTRACT

A control apparatus (151) selects a target core network entity for providing a mobility management service or a data transfer service to a radio terminal (111), from among a plurality of candidate core network entities (121, 141, 142) having different route costs to the radio terminal (111) or having different sizes of a management range, based on at least one of: a delay tolerance level of the radio terminal (111); a frequency of occurrence of control signaling of the radio terminal (111); and a communication interval of the radio terminal (111). This contributes, for example, to determining which of a plurality of core network entities is used for a radio terminal by using one or more criteria (indices or parameters) other than the mobility of the radio terminal.

17 Claims, 9 Drawing Sheets

(56) References Cited

U.S. PATENT DOCUMENTS

| | | | |
|---|---|---|---|
| 2010/0080186 A1* | 4/2010 | Guo | H04W 28/08 |
| | | | 370/329 |
| 2013/0122911 A1 | 5/2013 | Zdarsky et al. | |
| 2013/0301540 A1 | 11/2013 | Draznin et al. | |
| 2014/0169269 A1 | 6/2014 | Salot et al. | |

FOREIGN PATENT DOCUMENTS

| | | | |
|---|---|---|---|
| EP | 3001728 A1 | 3/2016 | |
| JP | 2013-533711 A | 8/2013 | |
| WO | WO-2007/143714 A2 | 12/2007 | |
| WO | WO-2010/086014 A1 | 8/2010 | |
| WO | WO-2012/019615 A1 | 2/2012 | |

OTHER PUBLICATIONS

Extended European Search Report issued by the European Patent Office for European Application No. 15852097.3 dated May 28, 2018 (7 pages).

\* cited by examiner

CONTROL DEVICE AND METHOD THEREFOR

CROSS-REFERENCE TO RELATED APPLICATIONS

This application is a national stage application of International Application No. PCT/JP2015/004404 entitled "Control Apparatus and Its Method" filed on Aug. 31, 2015, which claims priority to Japanese Application No. 2014-217630 filed on Oct. 24, 2014, the disclosures of which are hereby incorporated by reference in their entirety.

TECHNICAL FIELD

The present disclosure relates to a mobile communication network, and more particularly to mobility management for radio terminals.

BACKGROUND ART

Patent Literature 1 discloses that a base station (evolved Node B (eNB)) receives an attach request from a radio terminal, determines whether the radio terminal is a stationary device, and establishes a connection between the radio terminal and a network by using a local component associated with the base station (eNB) when the radio terminal is a stationary device. Note that the local component can perform at least one of a plurality of functions provided by a remote mobility management entity (MME), a remote serving gateway (S-GW), and a remote packet data network (PDN) gateway (P-GW). The remote MME, the remote S-GW, and the remote P-GW are arranged in an evolved packet core (EPC) network. In one example, the attach request includes an indicator indicating whether or not the radio terminal is a stationary device, and the base station (eNB) determines whether or not the radio terminal is a stationary device based on this indicator.

In another example disclosed in Patent Literature 1, a home subscriber server (HSS) arranged in the EPC network determines whether or not the radio terminal is a stationary device based on subscriber information of the radio terminal. The base station (eNB) sends the attach request to the HSS through an MME device, receives a response from the HSS through the MME device, and determines whether or not the radio terminal is a stationary device based on the response from the HSS. To establish a connection between the radio terminal and the network, the base station (eNB) uses a local component (e.g., a local MME component) when the radio terminal is a stationary device. Further, when the radio terminal is a mobile device, the base station (eNB) uses a remote MME, a remote S-GW, and a remote P-GW.

CITATION LIST

Patent Literature

Patent Literature 1: United State Patent Application Publication No. 2013/0301540

SUMMARY OF INVENTION

Technical Problem

As described above, Patent Literature 1 discloses that the base station (eNB) or the HSS determines whether or not a radio terminal is a stationary device, and a connection for the radio terminal is established by using a local component (e.g., a local MME component) associated with that base station when the radio terminal is a stationary device.

However, in some cases, the mobility level of the radio terminal (such as whether or not the radio terminal is a stationary device) might not be a sufficient criterion for selecting a core network entity. For example, even if the radio terminal is a mobile device, the use of a local component in a radio access network may be more suitable than the use of a remote device in a core network when the radio terminal frequently performs communication or when the delay tolerance level of the radio terminal is low (i.e., the radio terminal do not tolerate delay).

An object to be attained by embodiments disclosed herein is to provide an apparatus, a method, and a program that contribute to determining which of a plurality of core network entities (e.g., an MME device arranged in a core network and a local MME component associated with a radio access network (e.g., a base station)) is used for a radio terminal by using one or more criteria (indices or parameters) other than the mobility of the radio terminal. It should be noted that the above-described object is merely one of the objects to be attained by embodiments disclosed herein. Other objects or problems and novel features will be made apparent from the following descriptions and the accompanying drawings.

Solution to Problem

In a first aspect, a control apparatus includes a memory and a processor coupled to the memory. The processor operates to select a target core network entity for providing a mobility management service or a data transfer service to the radio terminal, from among a plurality of candidate core network entities having different route costs to a radio terminal or having different sizes of a management range, based on at least one of: a delay tolerance level of the radio terminal, a frequency of occurrence of control signaling of the radio terminal; and a communication interval of the radio terminal.

In a second aspect, a method includes selecting a target core network entity for providing a mobility management service or a data transfer service to a radio terminal, from among a plurality of candidate core network entities having different route costs to a radio terminal or having different sizes of a management range, based on at least one of: a delay tolerance level of the radio terminal; a frequency of occurrence of control signaling of the radio terminal; and a communication interval of the radio terminal.

In a third aspect, a program includes instructions (software codes) for, when loaded into a computer, causing the computer to perform a method according to the above-described second aspect.

Advantageous Effects of Invention

The above-described aspects can provide an apparatus, a method, and a program that contribute to determining which of a plurality of core network entities is used for a radio terminal by using one or more criteria (indices or parameters) other than the mobility of the radio terminal.

DESCRIPTION OF EMBODIMENTS

Specific embodiments are explained hereinafter in detail with reference to the drawings. The same symbols are assigned to the same or corresponding elements throughout the drawings, and duplicated explanations are omitted as necessary for simplifying the explanation.

First Embodiment

Figure 1:
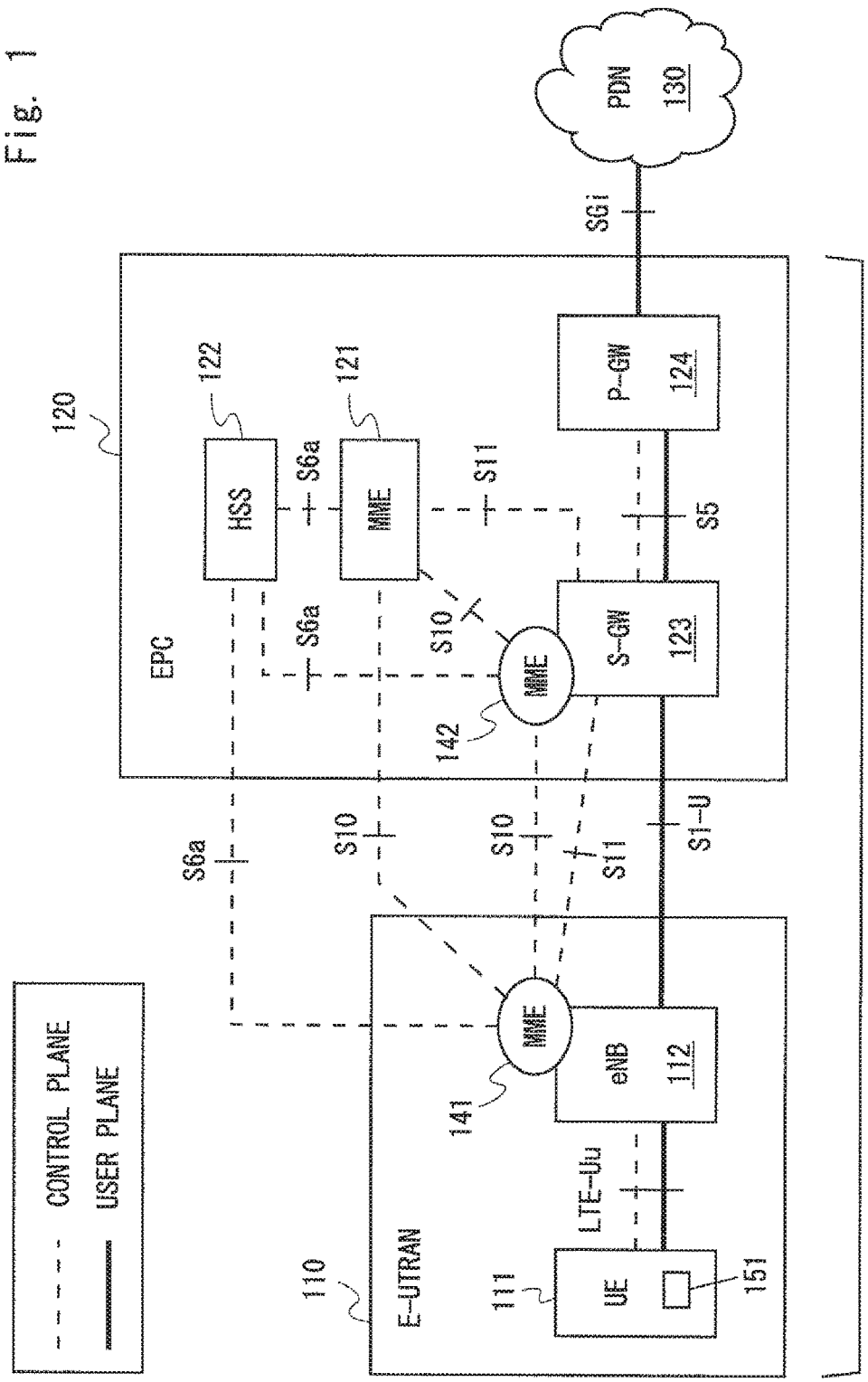
FIG. 1 shows a configuration example of a mobile communication network according to some embodiments.

FIG. 1 shows a configuration example of a Public Land Mobile Network (PLMN) 100 according to this embodiment. The PLMN 100 provides a communication service, for example, a voice communication service, a packet data communication service, or both of them to a radio terminal (User Equipment (UE)) 111. The PLMN 100 includes a radio access network (Evolved Universal Terrestrial Radio Access Network (E-UTRAN)) 110 and a core network (Evolved Packet Core (EPC)) 120. The E-UTRAN 110 includes a base station (eNB) 112 that wirelessly communicates with the UE 111. The EPC 120 includes a Mobility Management Entity (MME) device 121, a Home Subscriber Server (HSS) 122, a Serving Gateway (S-GW) 123, and a PDN Gateway (P-GW) 124.

For simplification of the illustration, FIG. 1 shows only one eNB 112, one S-GW 123, and one P-GW 124. However, the PLMN 100 may include a plurality of eNBs 112, a plurality of S-GWs 123, and a plurality of P-GWs 124. The MME device 121 and the HSS 122 may communicate with a plurality of eNBs, a plurality of S-GWs, and a plurality of P-GWs. The PLMN 100 may further include a plurality of MME devices 121 and a plurality of HSSs 122.

Each of the MME and the HSS 122 is a control plane node or entity arranged in the EPC 120. The MME can perform mobility management and bearer management for a plurality of UEs including the UE 111. The mobility management is used to keep track of the current position of the UE and includes maintaining a mobility management (MM) context regarding the UE. The bearer management includes controlling establishment of an EPS bearer for enabling the UE to communicate with an external network (Packet Data Network (PDN)) 130 through the E-UTRAN 110 and the EPC 120, and maintaining a bearer management context (i.e., EPS bearer context) regarding the UE. The HSS 122 manages subscriber information of UEs including the UE 111.

Each of the S-GW 123 and the P-GW 124 is a user plane packet transmission node arranged in the EPC 120 and transfers user data (i.e., Internet Protocol (IP) packets). The S-GW 123 is a gateway to the E-UTRAN 110 and is connected to the eNB 112 through an S1-U interface. The P-GW 124 is a gateway to the PDN 130 and is connected to the PDN 130 through an SGi interface. The PDN 130 may be an external network such as the Internet or may be a network for an IP service (e.g., IP Multimedia Subsystem (IMS) service) provided by an operator managing the EPC 120.

An MME component 141 is associated with the eNB 112 and arranged remotely from the MME device 121 arranged in the EPC 120. The MME component 141 may be arranged integrally with the eNB 112. The MME component 141 may be arranged in the same geographical location as the eNB 112 or may be arranged in the same cell site as the eNB 112. The MME component 141 can perform at least one of a plurality of functions related to the mobility management and the bearer management provided by the MME device 121. For example, the MME component 141 may perform the tracking of UE 111. In other words, the MME component 141 may perform a location update procedure (i.e., Tracking Area Update (TAU) procedure) for the UE 111. Further or alternatively, the MME component 141 may establish an EPS bearer for the UE 111. In other words, the MME component 141 may perform a bearer establishment procedure (i.e., Service Request procedure) for the UE 111. Further or alternatively, the MME component 141 may perform the paging of the UE 111.

An MME component 142 is associated with the S-GW 123 and arranged remotely from the MME device 121 arranged in the EPC 120. The MME component 142 may be arranged integrally with the S-GW 123. The MME component 142 may be arranged in the same geographical location as the S-GW 123 or may be arranged in the same cell site as the S-GW 123. Similarly to the MME component 141, the MME component 142 can perform at least one of a plurality of functions related to the mobility management and the bearer management provided by the MME device 121.

The MME component 141 is arranged remotely from the MME device 121, and hence the route cost between the UE 111 and the MME component 141 differs from that between the UE 111 and the MME device 121. Further, the MME component 141 is arranged remotely from the MME component 142, and hence the route cost between the UE 111 and the MME component 141 differs from that between the UE 111 and the MME component 142. Note that the route cost is a cost necessary for a control message (e.g., a data packet) transmitted from the UE 111 to arrive at the MME component 141 (or vice versa) and can be defined by using various metrics. The route cost depends on, for example, a processing time in processing devices, such as an eNB, located between the UE 111 and the MME component 141, a processing time of packet transmission devices such as a router and a switch, and the transmission rate of communication lines between these devices. For example, the route cost may be defined by using the number of hops (the number of relay nodes) from the UE 111 to the MME component 141. A large hop number means a large route cost. For example, the route cost may be defined by using a delay time from the UE 111 to the MME component 141 or a Round Trip Time (RTT). A large delay time or a large RTT means a large route cost. Further, the route cost may be defined a plurality of metrics, e.g., the number of hops and the delay time. The route cost is also called "distance".

The MME component 141 associated with the eNB 112, the MME component 142 associated with the S-GW 123, and the MME device 121 arranged in the EPC 120 may be differentiated according to the sizes of their management ranges. In one example, the MME component 141 is used for the mobility management for UEs located in one or more cells managed by the eNB 112, and therefore its management range is relatively narrow. In one example, the MME component 142 is used for the mobility management for UEs located in a plurality of cells managed by a plurality of eNBs 112 connected to the S-GW 123, and therefore its management range has an intermediate size. In one example, the MME device 121 is used for the mobility management for UEs located in a number of cells managed by a number of eNBs 112 connected to a plurality of S-GWs 123, and therefore its management range is larger than those of the MME components 141 and 142.

An MME component that is arranged in association with a network node, such as the eNB 112 and the S-GW 123, may be assigned an IP address different from the IP address of the network node with which the MME component is associated, in order to differentiate that MME component from the network node. Alternatively, the MME component and the network node with which the MME component is associated use a common IP address, and they may be differentiated based on different Transmission Control Protocol (TCP) port numbers or different User Datagram Protocol (UDP) port numbers.

A control apparatus 151 selects an MME for performing mobility management of the UE 111. In one implementation, the control apparatus 151 may be arranged in the UE 111 as shown in FIG. 1. In another implementation, the control apparatus 151 may be arranged in the EPC 120, for example, in the MME device 121. In still another implementation, the control apparatus 151 may be arranged in the E-UTRAN 110, for example, in the eNB 112. In further another implementation, the control apparatus 151 may be arranged in a control node arranged outside the PLMN 100 (e.g., in a Software-Defined Network (SDN) controller, a Network Function Virtualization (NFV) controller, an Operations Support System (OSS), or an Element Management System (EMS)).

Figure 2:
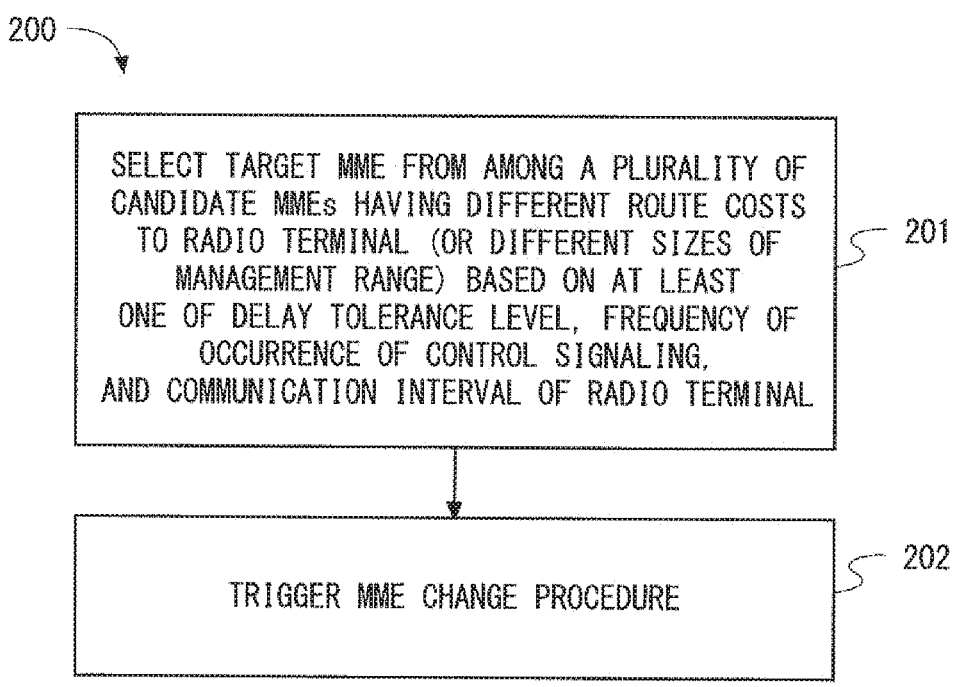
FIG. 2 is a flowchart showing an example of a process for an MME change according to a first embodiment.

FIG. 2 is a flowchart showing an example (process 200) of the MME selection process performed by the control apparatus 151. In Block 201, the control apparatus 151 selects a target MME for performing the mobility management of the UE 111 from among a plurality of candidate MMEs having different route costs to the UE 111 (or having different sizes of the management range) based on at least one of: a delay tolerance level of the UE 111; a frequency of occurrence of control signaling of the UE 111; and a communication interval of the UE 111. The control apparatus 151 may communicate with entities in the E-UTRAN 110 and in the EPC 120 in order to detect the candidate MMEs. Alternatively, the control apparatus 151 may receive a list of candidate MMEs from the serving MME, which is currently performing the mobility management of the UE 111 (e.g., the MME device 121), or from the eNB 112. The plurality of candidate MMEs include, for example, the MME component 141 associated with the eNB 112 and the MME device 121 arranged in the EPC 120. The plurality of candidate MMEs may further include the MME component 142 associated with the S-GW 123. In general, the MME component 141 associated with the eNB 112 has a smaller route cost and a narrower management range than the MME device 121 and the MME component 142 arranged in the EPC 120.

In Block 202, the control apparatus 151 triggers a control procedure for transferring the mobility management of the UE 111 from the serving MME to the target MME based on the MME selection in Block 501. In one implementation, the control apparatus 151 may transmit an MME change request message to the target MME or the serving MME. In implementations in which the control apparatus 151 is arranged in the target MME or the serving MME, the target MME or the serving MME may, on its own initiative, initiate the MME change procedure.

The control apparatus 151 may perform the MME selection as follows. In one implementation, when the delay tolerance level of the UE 111 is lower than a threshold (i.e., when the UE 111 cannot tolerate a delay), the control apparatus 151 may select an MME having a route cost (or a management range) smaller (or narrower) than that of the MME device 121 as the target MME. For example, the control apparatus 151 may select the MME component 141 associated with the E-UTRAN 110 (e.g., the eNB 112) as the target MME. As a result, the delay time necessary for processing of the control signaling can be reduced.

In one implementation, when the response time (e.g., a Round Trip Time (RTT)) of the serving MME (e.g., the MME device 121) exceeds a threshold, the UE 111 may select an MME (e.g., the MME component 141) having a route cost (or a management range) smaller (or narrower) than that of the serving MME as the target MME. The threshold used in this process may be determined based on the delay tolerance level of the UE 111 in such a manner that the smaller the delay tolerance level of the UE 111 is, the lower the threshold is set.

In one implementation, when the frequency of occurrence of control signaling performed by the UE 111 exceeds a threshold, the control apparatus 151 may select an MME having a route cost (or a management range) smaller (or narrower) than that of the MME device 121 as the target MME. For example, the control apparatus 151 may select the MME component 141 associated with the E-UTRAN 110 (e.g., the eNB 112) as the target MME. As a result, it is possible to mitigate an increase of a load on a control plane (e.g., a communication device and a communication line) caused by frequent occurrences of signaling between the E-UTRAN 110 and the EPC 120.

In one implementation, when the communication interval of the UE 111 is lower than the threshold (i.e., the communication interval of the UE 111 is short), the control apparatus 151 may select an MME having a route cost (or a management range) smaller (or narrower) than that of the MME device 121 as the target MME. For example, the control apparatus 151 may select the MME component 141 associated with the E-UTRAN 110 (e.g., the eNB 112) as the target MME. As a result, it is possible to mitigate an increase of a load on a control plane (e.g., a communication device and a communication line) caused by frequent occurrences of signaling between the E-UTRAN 110 and the EPC 120.

In one implementation, the control apparatus 151 may select an MME while taking into account loads on respective network nodes. For example, when the load on the MME device 121 exceeds a threshold, the control apparatus 151 may select an MME having a smaller load than the MME device 121 as the target MME.

Alternatively, the control apparatus 151 may monitor the load states of a plurality of MMEs (e.g., the MME device 121, the MME component 141, and the MME component 142) and select the target MME so that the load for the mobility management is distributed over these MMEs. The above-described examples of the MME selection based on different parameters may be combined as appropriate.

In the above-described examples of the MME selection, the control apparatus 151 itself may measure a parameter used for the MME selection (e.g., the response time (e.g., RTT) of each network node, the load of each network node, or the route cost (e.g., the number of hops, the delay time, or the distance)). For example, the control apparatus 151 may measure the time from when the UE 111 transmits a control message to when the UE 111 receives its response message in order to measure the response time (RTT) or the route cost. The control apparatus 151 may use "ping" or "traceroute" defined in the Internet Control Message Protocol (ICMP) in order to measure the response time (RTT) or the route cost. Alternatively, the control apparatus 151 may receive a parameter value(s) used for the MME selection that is/are measured in the UE 111 or in one or more network nodes arranged in the E-UTRAN 110 or in the EPC 120 from the UE 111 or these network nodes. Alternatively, the control apparatus 151 may receive the parameter value(s) from a control node arranged outside the PLMN 100 (e.g., from an SDN controller, an NFV controller, an OSS, or an EMS).

As can be understood from the above explanation, in this embodiment, the control apparatus 151 operates to select the target MME for performing the mobility management of the UE 111 from among a plurality of candidate MMEs having different route costs to the UE 111 (or having different sizes of the management range) based on at least one of: the delay tolerance level of the UE 111; the frequency of occurrence of control signaling of the UE 111; and the communication interval of the UE 111. Therefore, the control apparatus 151 can select the MME for performing the mobility management of the UE 111 by using one or more criteria (indices or parameters) other than the mobility of the UE 111.

Note that the control apparatus 151 may take into account the mobility of the UE 111 in the MME selection in addition to the delay tolerance level of the UE 111, the frequency of occurrence of control signaling of the UE 111, or the communication interval of the UE 111. In one implementation, when the mobility of the UE 111 is lower than a threshold, the control apparatus 151 may select, as the target MME, an MME having a smaller route cost (or a narrower management range) than the MME device 121. For example, the control apparatus 151 may select the MME component 141 associated with the E-UTRAN 110 (e.g., the eNB 112) as the target MME. If the mobility of the UE 111 is high, selecting the MME component 141 associated with the E-UTRAN 110 could lead to frequent changes of MMEs and hence an increase in the number of control signaling processes. In contrast to this, if the mobility of the UE 111 is low, it can be expected that the increase in the signaling cost caused by frequent changes of MMEs is small. Therefore, when the mobility of the UE 111 is low, selecting the MME component 141 associated with the E-UTRAN 110 can reduce the delay time necessary for processing of the control signaling, while preventing the increase in the signaling cost caused by frequent changes of MMEs. The level of the mobility of the UE 111 may be evaluated, for example, by using an average time of stay in a cell, a frequency of occurrence of handovers, or an average interval of occurrence of handovers.

Second Embodiment

Figure 3:
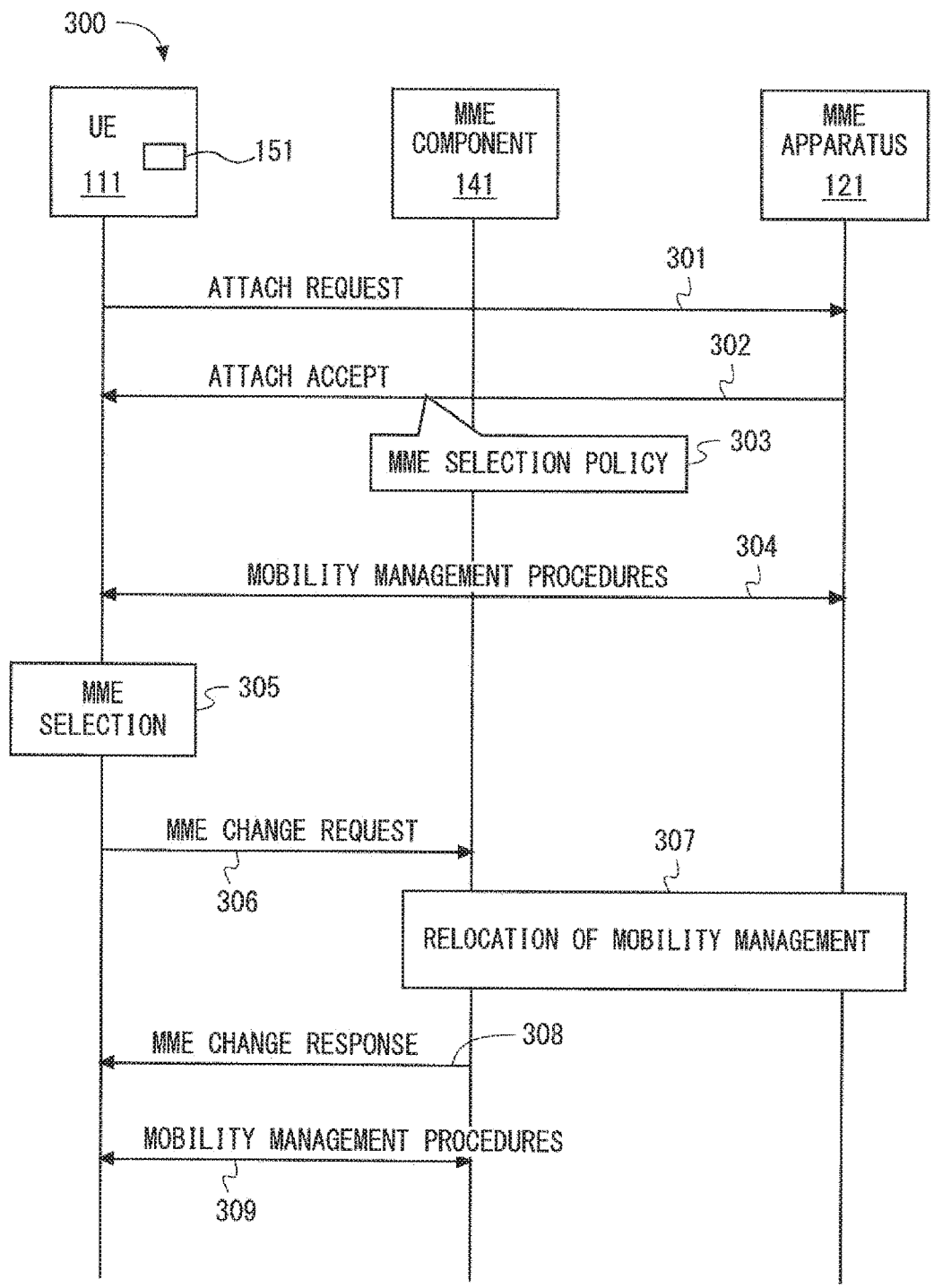
FIG. 3 is a sequence diagram showing an example of an MME change procedure according to a second embodiment.

This embodiment provides a specific example of the MME change procedure explained in the first embodiment. The configuration example of a mobile communication network according to this embodiment may be the same as the configuration that is explained above in the first embodiment and shown in FIG. 1. FIG. 3 is a sequence diagram showing an example (process 300) of an MME change procedure according to this embodiment. In the example shown in FIG. 3, the control apparatus 151 is arranged in the UE 111.

In Block 301, the UE 111 transmits an Attach Request message to the MME device 121. Note that the MME selection in Block 301 may be performed by an MME selecting function within the eNB 112 that has received the Attach Request. In Block 302, the MME device 121, which serves as the serving MME, transmits an Attach Accept message to the UE 111. This Attach Accept message includes the MME selection policy. Alternatively, the MME selection policy may be transmitted by using another Non-Access Stratum NAS) message (e.g., a TAU Accept message) instead of the Attach Accept message. The MME selection policy may be transmitted from the serving MME (the MME device 121) to the UE 111 during a procedure different from the attach procedure (Blocks 301 and 302), for example, in a TAU procedure. Alternatively, the UE 111 may receive the MME selection policy from the HSS 122 or the eNB 112. The UE 111 may receive the MME selection policy from a control server arranged in the PDN 130 on the user plane through the PLMN 100. In Block 304, a mobility management procedure (e.g., a TAU procedure, a Service Request procedure, and paging) is performed between the UE 111 and the MME device 121 (the serving MME).

In one example, the MME selection policy indicates one or more parameters taken into account for the MME selection. The parameter(s) taken into account for the MME selection may include a parameter related to at least one of: a delay tolerance level of the UE 111; a frequency of occurrence of control signaling performed by the UE 111; and a communication interval of the UE 111. The parameter(s) taken into account for the MME selection may include load information of the network node (e.g., the eNB 112, the MME device 121, the HSS 122, and the S-GW 123). Further or alternatively, the selection policy may designate a selection algorithm. Specifically, the selection policy may indicate (a) a parameter(s) to be taken into account, (b) a threshold, (c) an identifier of an MME (e.g., the MME component 141) that should be selected when the parameter exceeds the threshold, and (d) an identifier of an MME (e.g., the MME device 121 or the MME component 142) that should be selected when the parameter does not exceed the threshold. Further or alternatively, the MME selection policy may indicate a timing at which the MME selection is performed or a cycle in which the MME selection is periodically performed.

In Block 305, based on the MME selection policy, the UE 111 (the control apparatus 151) selects the target MME from among a plurality of candidate MMEs having different route costs to the UE 111 (or having different sizes of the management range). In the example shown in FIG. 3, the MME component 141 associated with the eNB 112 is selected as the target MME. In Block 306, the UE 111 (the control apparatus 151) transmits an MME change request message to the MME component 141 (target MME). In Block 307, in response to the reception of the MME change request message, the MME component 141 initiates a control procedure for transferring the mobility management for the UE 111 from the MME device 121 (serving MME) to the MME component 141 (target MME). In Block 308, the MME component 141 transmits an MME change response message to the UE 111. In Block 309, a mobility management procedure is performed between the UE 111 and the MME component 141 (target MME, i.e., a new serving MME).

Figure 4:
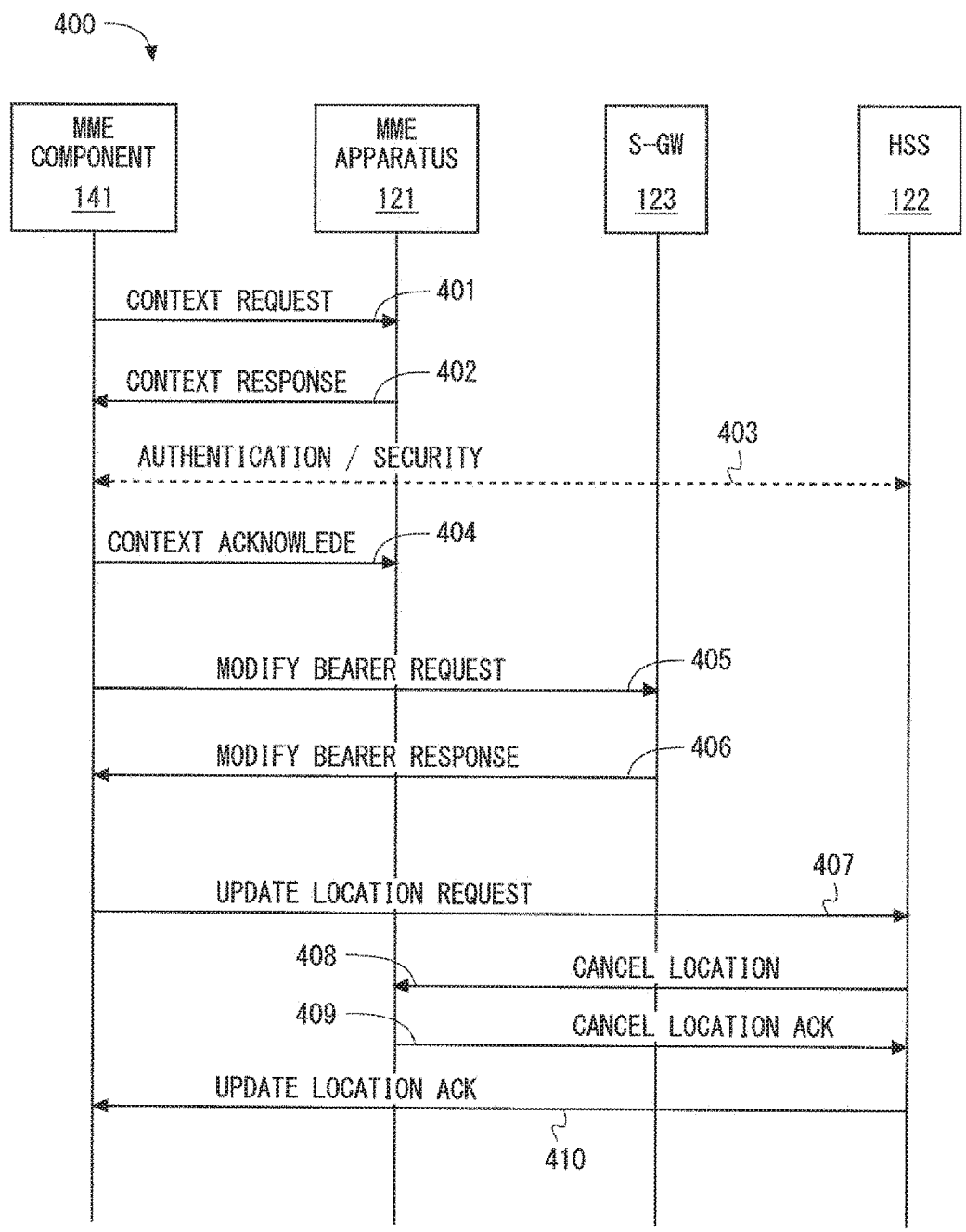
FIG. 4 is a sequence diagram showing an example of a mobility management relocation procedure according to the second embodiment.

The control procedure for transferring the mobility management for the UE 111 (block 307) may be similar to the procedure for transferring the mobility management from an old MME to a new MME performed during the TAU procedure that is performed when the UE 111 detects that it enters a new TA (Tracking Area). FIG. 4 is a sequence diagram showing a specific example (process 400) of the control procedure (block 307). In Block 401, the MME component 141 (target MME) transmits a Context Request message to the MME device 121 (serving MME). In Block 402, the MME device 121 transmits to the MME component 141 a Context Response message including a context (MM context and EPS bearer context) of the UE 111. In Block 403, the MME component 141 communicates with the HSS 122 and the UE 111 (not shown) for the authentication and the security setup of the UE 111. When the authentication and the security setup of the UE 111 have been effective, Block 403 may be omitted. In Block 404, the MME component 141 transmits a Context Acknowledge message to the MME device 121.

In Block 405, the MME component 141 transmits a Modify Bearer Request message to the S-GW 123 in order to inform the S-GW 123 of the address of the new MME (i.e., the MME component 141). The Modify Bearer Request message indicates an IP address and an MME TEID of the new MME that manages the EPS bearer of the UE 111, i.e., the MME component 141. In Block 406, the S-GW 123 transmits a Modify Bearer Response message to the MME component 141.

Blocks 407 to 410 are performed in order to inform the HSS 122 of the MME change. Note that it is also possible to inform the HSS 122 of the MME change in an ordinary TAU procedure that is performed after completion of the MME relocation procedure (400). Accordingly, the processes in Blocks 407 to 410 may be omitted. In Block 407, the MME component 141 transmits an Update Location Request message to the HSS 122. The Update Location Request message indicates an identifier of the MME component 141. In Block 408, the HSS 122 transmits a Cancel Location message to the MME device 121 to inform the MME device 121 that the context regarding the UE 111 (MM context and EPS bearer context) can be released. In Block 409, the MME device 121 releases, if necessary, the context regarding the UE 111. Then, the MME device 121 transmits a Cancel Location Ack message to the HSS 122. In Block 410, the HSS 122 acknowledges the Update Location Request by transmitting an Update Location Ack message to the MME component 141.

Following the control procedure explained in this embodiment, it is possible to select an MME for performing the mobility management of the UE 111 by using one or more criteria (indices or parameters) other than the mobility of the UE 111.

Further, following the control procedure explained in this embodiment, the MME selection can be carried out in the UE 111. Accordingly, the MME selection can be easily performed according to the dynamically changing state of the UE 111 (e.g., delay tolerance level, mobility characteristic, a frequency of occurrence of signaling, or communication interval).

Furthermore, in the control procedure explained in this embodiment, the UE 111 operates to receive the MME selection policy from the network (e.g., the MME device 121). Therefore, the MME selection policy can be determined in the network, thus making it possible to set an MME selection policy that is determined according to the state of the network (e.g., the load on the MME or the occurrence/ non-occurrence of congestion) in the UE 111.

Third Embodiment

Figure 5:
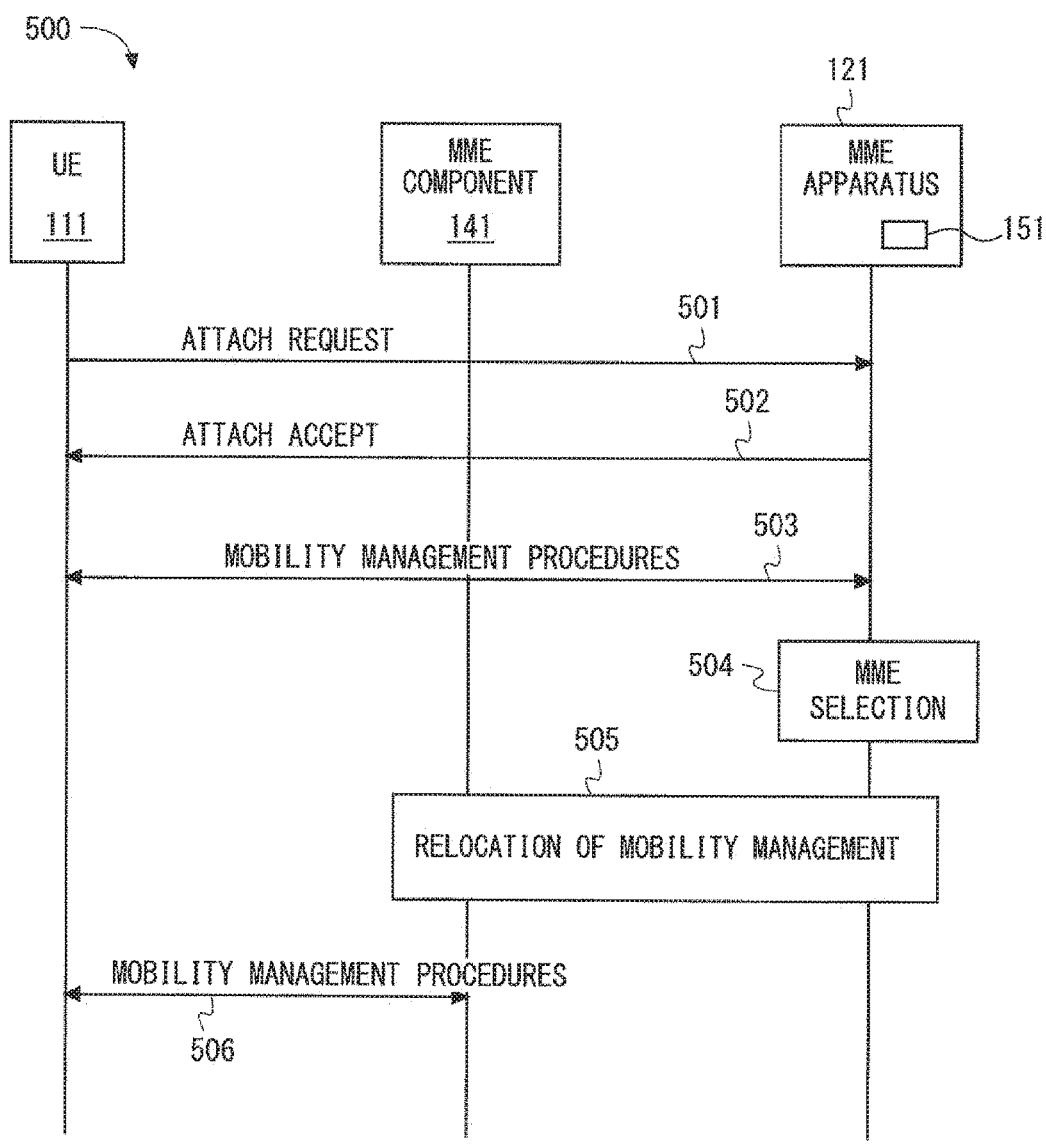
FIG. 5 is a sequence diagram showing an example of an MME change procedure according to a third embodiment.

In this embodiment, a specific example of the MME change procedure explained in the first embodiment is explained. The configuration example of a mobile communication network according to this embodiment may be the same as the configuration that is explained above in the first embodiment and shown in FIG. 1. FIG. 5 is a sequence diagram showing an example (process 500) of an MME change procedure according to this embodiment. In the example shown in FIG. 5, the control apparatus 151 is arranged in the MME device 121.

Processes in Blocks 501 to 503 in FIG. 5 are similar to those in Blocks 301 to 303 in FIG. 3. However, the Attach Accept message in Block 502 does not necessarily have to include the MME selection policy. In Block 504, the MME device 121 (the control apparatus 151), which is the serving MME, selects the target MME for performing the mobility management of the UE 111 from among a plurality of candidate MMEs having different route costs to the UE 111 (or having different sizes of the management range) based on at least one of: a delay tolerance level of the UE 111; a frequency of occurrence of control signaling of the UE 111; and a communication interval of the UE 111. In the example shown in FIG. 5, the MME component 141 associated with the eNB 112 is selected as the target MME.

In Block 505, the MME device 121 initiates a control procedure for transferring the mobility management of the UE 111 from the MME device 121 (serving MME) to the MME component 141 (target MME). In Block 506, a mobility management procedure is performed between the UE 111 and the MME component 141 (target MME, i.e., a new serving MME).

Figure 6:
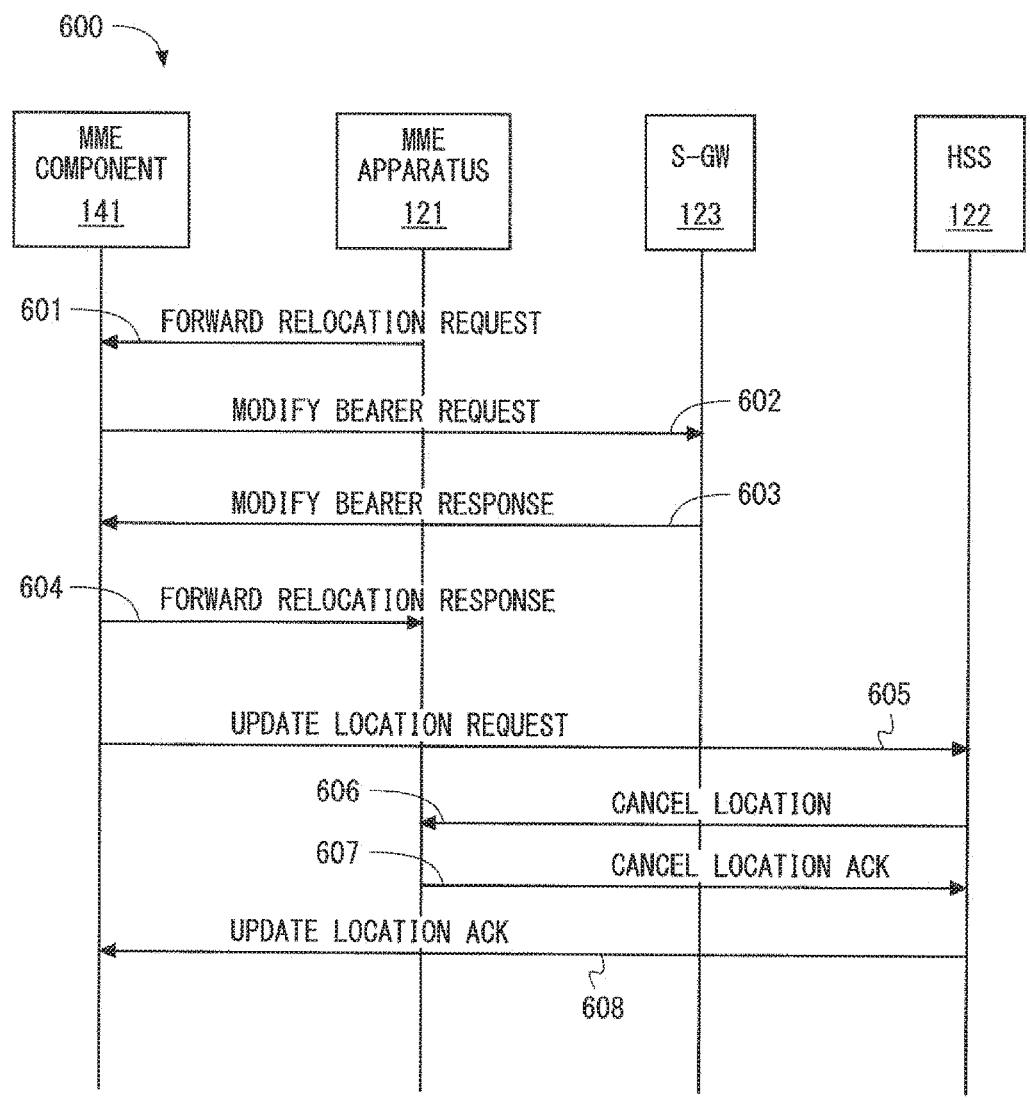
FIG. 6 is a sequence diagram showing an example of a mobility management relocation procedure according to the third embodiment.

The control procedure for transferring the mobility management of the UE 111 (block 505) is similar to the procedure for transmitting a UE context from a source MME to the target MME by using a Forward Relocation Request message that is performed during the S1-based handover. FIG. 6 is a sequence diagram showing a specific example (process 600) of the control procedure (block 505).

In Block 601, the MME device 121 (serving MME) transmits a context (MM context and EPS bearer context) of the UE 111 to the MME component 141 (target MME). For this transmission, a GPRS Tunnelling Protocol for the Control Plane (GTP-C) message, which is used in an S10 interface between MMEs, can be used. Specifically, as shown in FIG. 6, a Forward Relocation Request message or a message modified therefrom may be used. The Forward Relocation Request message in Block 601 may include an information element indicating that the message is not a message transmitted for an S1-based handover but is a message transmitted for a Context Relocation.

In Block 602, the MME component 141 stores the context of the UE 111 received from the MME device 121 into its own memory or storage (not shown). The MME component 141 requests the S-GW 123 to update an EPS bearer context of the UE 111 held in the S-GW 123 (block 603). Processes in Blocks 602 and 603 are similar to those in blocks 405 and 406 in FIG. 4. In Block 604, the MME component 141 notifies the MME device 121 of acceptance of the taking-over of the mobility management and the bearer management for the UE 111. For the transmission of this notification, a GTP-C message, which is used in an S10 interface between MMEs, can be used. Specifically, as shown in FIG. 6, a Forward Relocation Response message or a message modified therefrom may be used.

Processes in Blocks 605 to 608 are performed to notify the HSS 122 of the MME change. Processes in Blocks 605 to 608 are similar to those in Blocks 407 to 410 in FIG. 4.

Following the control procedure explained in this embodiment, it is possible to select an MME for performing the mobility management of the UE 111 by using one or more criteria (indices or parameters) other than the mobility of the UE 111.

Fourth Embodiment

In the first to third embodiments, examples of the MME selection are explained. The technical idea explained in the first to third embodiments can be applied to a selection of a core network entity (e.g., an S-GW, a P-GW, or both of them) on a user plane that provides a data transfer service to the UE 111. This embodiment provides an example in which the control apparatus 151 selects a core network entity on a user plane (hereinafter called "core network user plane entity").

Figure 7:
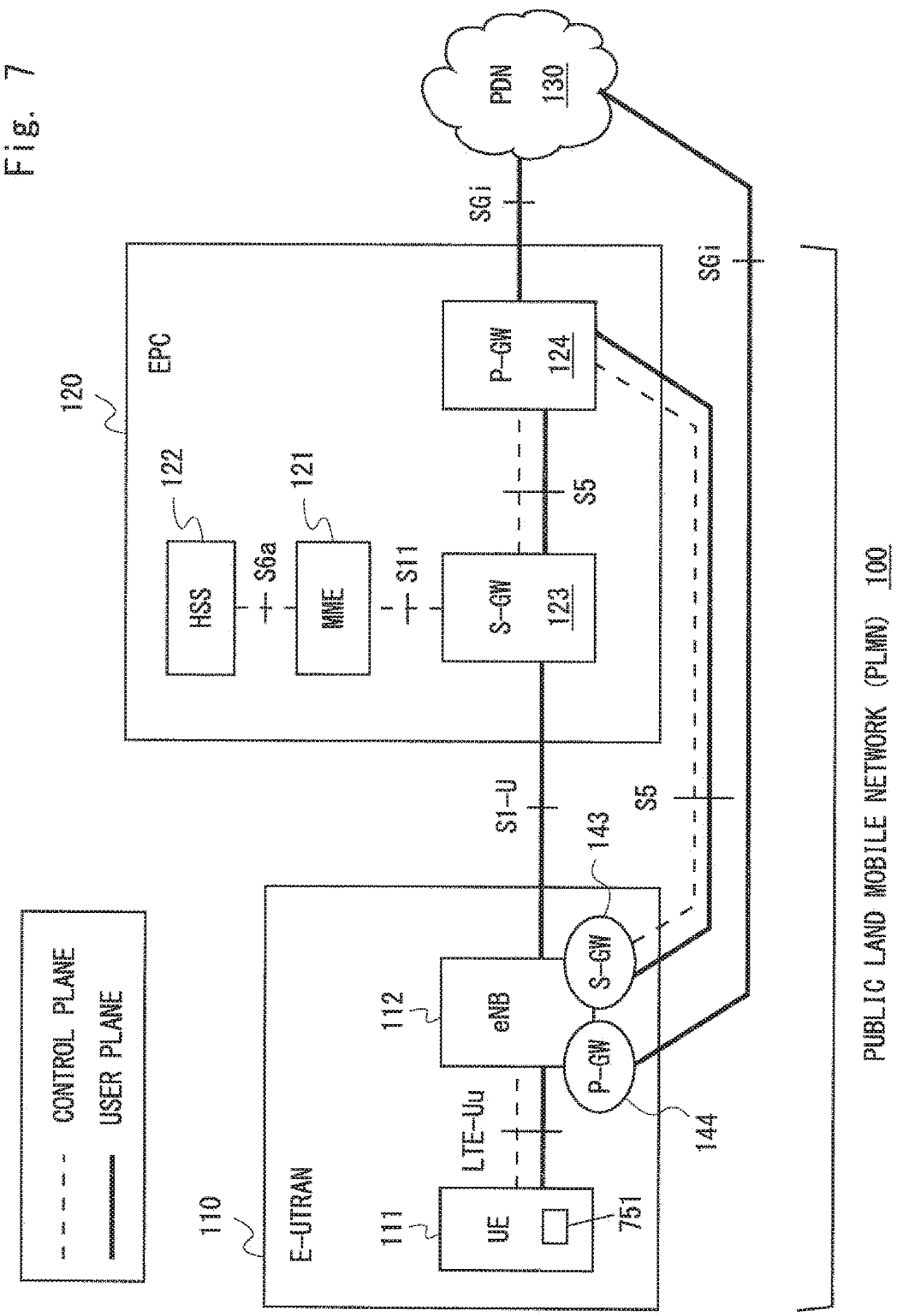
FIG. 7 shows a configuration example of a mobile communication network according to some embodiments.

FIG. 7 shows a configuration example of a Public Land Mobile Network (PLMN) 100 according to this embodiment. In the example shown in FIG. 7, the PLMN 100 includes an S-GW component 143 and a P-GW component 144 that are arranged in association with an eNB 112.

A control apparatus 751 performs selection of an S-GW or a P-GW or both for providing a data transfer service to the UE 111. In one implementation, the control apparatus 751 may be arranged in the UE 111 as shown in FIG. 7. In another implementation, the control apparatus 751 may be arranged in the EPC 120, for example, in the MME device 121. In still another implementation, the control apparatus 751 may be arranged in the E-UTRAN 110, for example, in the eNB 112. In further another implementation, the control apparatus 751 may be arranged in a control node arranged outside the PLMN 100 (e.g., an SDN controller, an NFV controller, an OSS, or an EMS).

Figure 8:
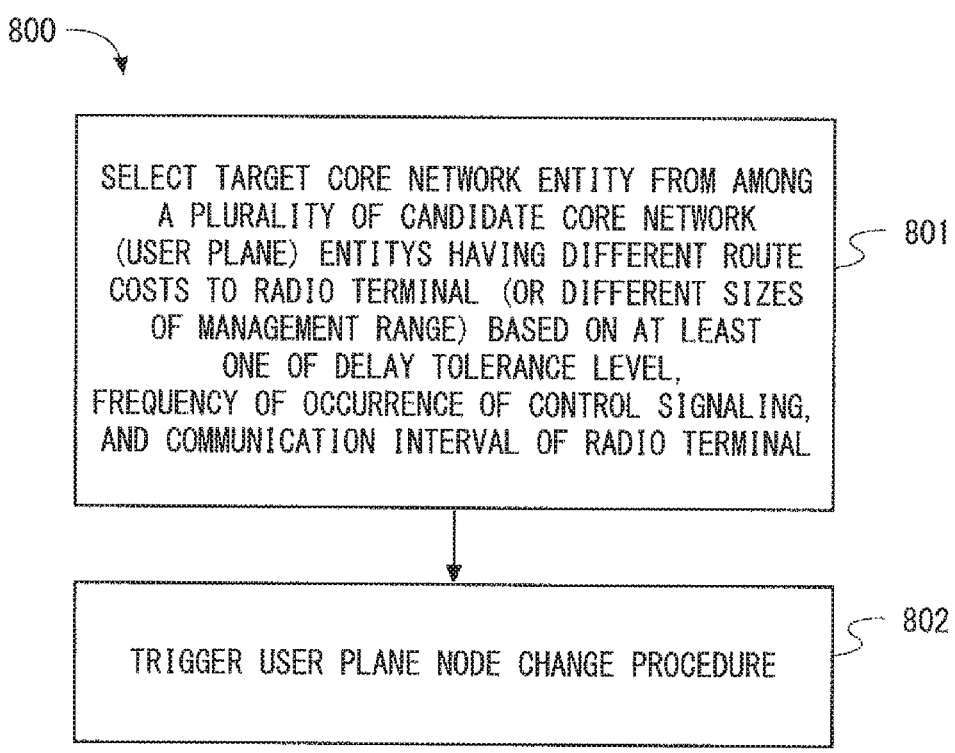
FIG. 8 is a flowchart showing an example of a process for changing a core network entity on a user plane according to a fourth embodiment.

FIG. 8 is a flowchart showing an example (process 800) of the process for selecting a core network user plane entity performed by the control apparatus 751. In Block 801, the control apparatus 751 selects a target core network entity for performing the mobility management of the UE 111 from among a plurality of candidate core network entities having different route costs to the UE 111 (or having different sizes of the management range) based on at least one of: a delay tolerance level of the UE 111; a frequency of occurrence of control signaling of the UE 111; and a communication interval of the UE 111. The control apparatus 751 may communicate with entities in the E-UTRAN 110 and in the EPC 120 in order to detect the candidate core network entities. Alternatively, the control apparatus 151 may receive a list of candidate core network entities from the serving MME, which is currently performing the mobility management of the UE 111 (e.g., the MME device 121), or from the eNB 112. The plurality of candidate core network entities include, for example, the S-GW component 143 associated with the eNB 112 and the S-GW 123 arranged in the EPC 120. The plurality of candidate core network entities may include the P-GW component 144 associated with the eNB 112 and the P-GW 124 arranged in the EPC 120. In general, the S-GW component 143 and the P-GW component 144 associated with the eNB 112 have smaller route costs and narrower management ranges than the S-GW 123 and the P-GW 124 arranged in the EPC 120, respectively.

A specific example of the selection of a core network user plane entity performed by the control apparatus 751 is similar to that of the MME selection performed by the control apparatus 151 explained in the first embodiment, and therefore its explanation is omitted here.

In Block 802, the control apparatus 751 triggers a control procedure for transferring the data transfer service for the UE 111 to the target core network entity based on the selection of the core network entity in Block 801. In one implementation, the control apparatus 751 may transmit a change request message to the serving MME (e.g., the MME 121). In implementations in which the control apparatus 751 is arranged in the serving MME, the serving MME may, on its own initiative, initiate the procedure for changing the core network user plane entity.

In this embodiment, it is possible to select the core network user plane entity for performing the data transfer service for the UE 111 based on one or more criteria (indices or parameters) other than the mobility of the UE 111.

Figure 9:
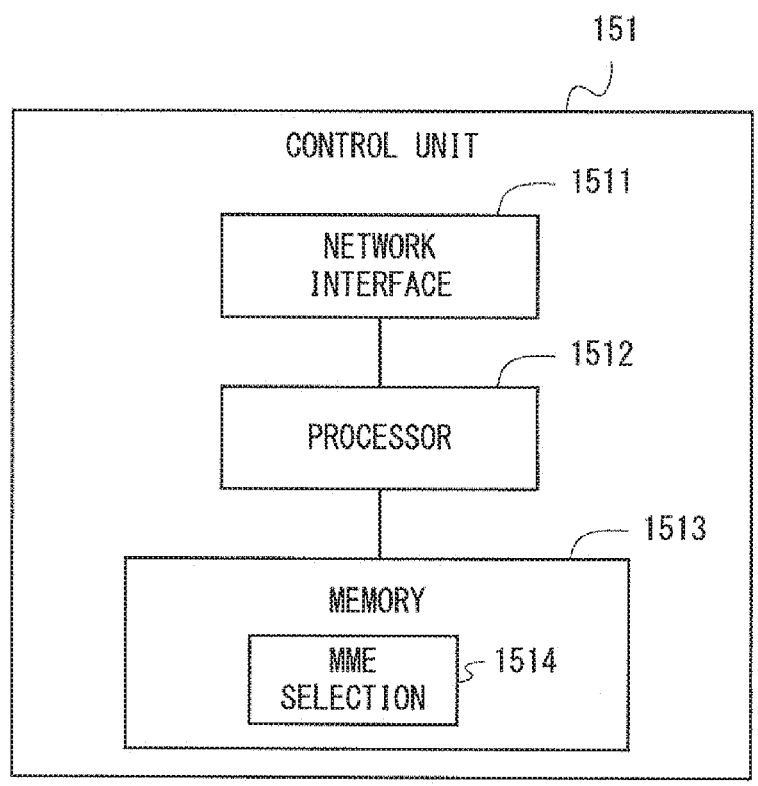
FIG. 9 is a block diagram showing a configuration example of a control apparatus according to some embodiments.

Lastly, configuration examples of the control apparatuses 151 and 751 according to the above-described first to fourth embodiments are explained. FIG. 9 shows a configuration example of the control apparatus 151. The control apparatus 751 may have a configuration similar to that shown in FIG. 9. Referring to FIG. 9, the control apparatus 151 includes a network interface 1511, a processor 1512, and a memory 1513. The network interface 1511 is used to communicate with a network node(s) or a device(s) (e.g., the UE 111, the eNB 112, the MME device 121, the HSS 122, and the S-GW 123). The network interface 1511 may include, for example, a Network Interface Card (NIC) conforming to the IEEE 802.3 series.

The processor 1512 loads software (computer program) from the memory 1513 and executes the loaded software, and thereby performs processes of the control apparatus 151 related to the process 200, 300 or 500 explained in the above-described embodiments. The processor 1512 may be, for example, a microprocessor, a Micro Processing Unit (MPU), or a Central Processing Unit (CPU). The processor 1512 may include a plurality of processors.

The memory 1513 includes a volatile memory and a nonvolatile memory. The volatile memory is, for example, a Static Random Access Memory (SRAM), a Dynamic RAM (DRAM), or a combination of them. The nonvolatile memory is, for example, a Mask Read Only Memory (MROM), a Programmable ROM (PROM), a flash memory, a hard disk drive, or any combination of them. The memory 1513 may include a storage that is remotely arranged from the processor 1512. In this case, the processor 1512 may access the memory 1513 through the network interface 1511 or an I/O interface (not shown).

In the example shown in FIG. 9, the memory 1513 is used to store software modules including an MME selection module 1514. The MME selection module 1514 includes instructions and data necessary for performing processes of the control apparatus 151 related to the process 200, 300 or 500 explained in the above-described embodiments. The processor 1512 loads software modules including the MME selection module 1514 from the memory 1513 and executes these loaded modules, and thereby performs processes of the control apparatus 151 explained in the above-described embodiments.

As explained above with reference to FIG. 9, each of the processors included in the control apparatuses 151 and 751 according to the above-described embodiments executes one or more programs including instructions to cause a computer to perform an algorithm explained with reference to the drawings. These programs can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs can be supplied to a computer by using various types of transitory computer readable media. Examples of the transitory computer readable media include an electrical signal, an optical signal, and an electromagnetic wave. The transitory computer readable media can be used to supply programs to a computer through a wire communication path such as an electrical wire and an optical fiber, or through a wireless communication path.

Other Embodiments

Each of the above-described embodiments may be used individually, or two or more of the embodiments may be appropriately combined with one another.

In the above-described embodiments, at least one of the MME device 121, the MME component 141, and the MME component 142 may be a virtualized MME using a server virtualization technology and a network virtualization technology. Similarly, at least one of the S-GW 123, the P-GW 124, the S-GW component 143, and the P-GW component 144 may be a virtualized S-GW (or a virtualized P-GW) using a server virtualization technology and a network virtualization technology. Each of the virtualized MME, S-GW, and P-GW may be implemented as a virtual machine configured in a server pool or a virtual router configured in physical switches.

The above-described embodiments are explained by using specific examples mainly related to the EPS. However, these embodiments may be applied to other mobile communication systems such as a Universal Mobile Telecommunications System (UMTS), a 3GPP2 CDMA2000 system (1×RTT, High Rate Packet Data (HRPD)), a Global System for Mobile communications (GSM)/General packet radio service (GPRS) system, and a mobile WiMAX system.

Further, the above-described embodiments are merely examples of applications of the technical ideas obtained by the inventor. Needless to say, these technical ideas are not limited to the above-described embodiments and various modifications can be made thereto.

This application is based upon and claims the benefit of priority from Japanese patent application No. 2014-217630, filed on Oct. 24, 2014, the disclosure of which is incorporated herein in its entirety by reference.

REFERENCE SIGNS LIST

110 EVOLVED UNIVERSAL TERRESTRIAL RADIO ACCESS NETWORK (E-UTRAN)
111 USER EQUIPMENT (UE)
112 eNodeB (eNB)
120 EVOLVED PACKET CORE (EPC)
121 MOBILITY MANAGEMENT ENTITY (MME) DEVICE
122 HOME SUBSCRIBER SERVER (HSS)
123 SERVING GATEWAY (S-GW)
124 PACKET DATA NETWORK GATEWAY (P-GW)
130 PACKET DATA NETWORK (PDN)
141 MME COMPONENT
142 MME COMPONENT
143 S-GW COMPONENT
144 P-GW COMPONENT
143 S-GW COMPONENT
144 P-GW COMPONENT
151 CONTROL APPARATUS
751 CONTROL APPARATUS
1512 PROCESSOR
1513 MEMORY

The invention claimed is:

1. A control apparatus comprising:
at least one memory that stores instructions; and
at least one processor configured to execute the instructions to select a target core network entity for providing a mobility management service or a data transfer service to the radio terminal, from among a plurality of candidate core network entities having different route costs to the radio terminal or having different sizes of a management range, based on at least one of: a delay tolerance level of the radio terminal; a frequency of occurrence of control signaling of the radio terminal; and a communication interval of the radio terminal; wherein
the plurality of candidate core network entities include a first core network entity arranged in association with a core network node and a second core network entity arranged in association with a radio access network node, the second core network entity having a smaller route cost to the radio terminal than the first core network entity.

2. The control apparatus according to claim 1, wherein the at least one processor is configured to select the first core network entity as the target core network entity when the delay tolerance level is a first level, and select the second core network entity as the target core network entity when the delay tolerance level is a second level indicating a smaller tolerance to a network delay than the first level.

3. The control apparatus according to claim 1, wherein the at least one processor is configured to select the second core network entity as the target core network entity when a delay time or a response time related to communication between the radio terminal and the first core network entity exceeds a threshold determined based on the delay tolerance level.

4. The control apparatus according to claim 1, wherein the at least one processor is configured to select the first core network entity as the target core network entity when the frequency of occurrence of control signaling is a first value, and select the second core network entity as the target core network entity when the frequency of occurrence of control signaling is a second value larger than the first value.

5. The control apparatus according to claim 1, wherein the at least one processor selects the first core network entity as the target core network entity when the communication interval is a first value, and selects the second core network entity as the target core network entity when the communication interval is a second value, the second value indicating a shorter communication interval than the first interval.

6. The control apparatus according to claim 1, wherein the core network entity is a mobility management entity (MME) that provides the mobility management service.

7. The control apparatus according to claim 1, wherein the core network entity is a Serving Gateway (S-GW) or a Packet Data Network Gateway (P-GW) that provides the data transfer service.

8. The control apparatus according to claim 1, wherein the control apparatus is arranged in the radio terminal.

9. The control apparatus according to claim 1, wherein the control apparatus is arranged in a core network.

10. A method for selecting a target core network entity for providing a mobility management service or a data transfer service to a radio terminal, the method comprising:
selecting the target core network entity, from among a plurality of candidate core network entities having different route costs to the radio terminal or having different sizes of a management range, based on at least one of: a delay tolerance level of the radio terminal; a frequency of occurrence of control signaling of the radio terminal; and a communication interval of the radio terminal; wherein the plurality of candidate core network entities include a first core network entity arranged in association with a core network node and a second core network entity arranged in association with a radio access network node, the second core network entity having a smaller route cost to the radio terminal than the first core network entity.

11. The method according to claim 10, wherein the selecting comprises selecting the first core network entity as the target core network entity when the delay tolerance level is a first level, and selecting the second core network entity as the target core network entity when the delay tolerance level is a second level, the second level indicating a smaller tolerance to a network delay than the first level.

12. The method according to claim 10, wherein the selecting comprises selecting the second core network entity as the target core network entity when a delay time or a response time related to communication between the radio terminal and the first core network entity exceeds a threshold determined based on the delay tolerance level.

13. The method according to claim 10, wherein the selecting comprises selecting the first core network entity as the target core network entity when the frequency of occurrence of control signaling is a first value, and selecting the second core network entity as the target core network entity when the frequency of occurrence of control signaling is a second value larger than the first value.

14. The method according to claim 10, wherein the selecting comprises selecting the first core network entity as the target core network entity when the communication interval is a first value, and selecting the second core network entity as the target core network entity when the communication interval is a second value, the second value indicating a shorter communication interval than the first interval.

15. The method according to claim 10, wherein the core network entity is a mobility management entity (MME) that provides the mobility management service.

16. The method according to claim 10, wherein the core network entity is a Serving Gateway (S-GW) or a Packet Data Network Gateway (P-GW) that provides the data transfer service.

17. A non-transitory computer readable medium storing a program for causing a compute to perform a method for selecting a target core network entity for providing a mobility management service or a data transfer service to a radio terminal, wherein the method comprises:

selecting the target core network entity, from among a plurality of candidate core network entities having different route costs to the radio terminal or having different sizes of a management range, based on at least one of: a delay tolerance level of the radio terminal; a frequency of occurrence of control signaling of the radio terminal; and a communication interval of the radio terminal; wherein the plurality of candidate core network entities include a first core network entity arranged in association with a core network node and a second core network entity arranged in association with a radio access network node, the second core network entity having a smaller route cost to the radio terminal than the first core network entity.

* * * * *